US012184513B2

(12) United States Patent
Okabe et al.

(10) Patent No.: US 12,184,513 B2
(45) Date of Patent: Dec. 31, 2024

(54) CABLE CONNECTION MANAGEMENT SYSTEM AND CABLE CONNECTION MANAGEMENT METHOD

(71) Applicant: Nippon Telegraph and Telephone Corporation, Tokyo (JP)

(72) Inventors: Yuichi Okabe, Tokyo (JP); Toshishige Shimamura, Tokyo (JP); Yoshiyuki Doi, Tokyo (JP); Yuzo Ishii, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 524 days.

(21) Appl. No.: 17/611,823

(22) PCT Filed: May 31, 2019

(86) PCT No.: PCT/JP2019/021791
§ 371 (c)(1),
(2) Date: Nov. 16, 2021

(87) PCT Pub. No.: WO2020/240843
PCT Pub. Date: Dec. 3, 2020

(65) Prior Publication Data
US 2022/0255812 A1    Aug. 11, 2022

(51) Int. Cl.
*H04L 41/12* (2022.01)
*G06K 7/10* (2006.01)
*G06K 7/14* (2006.01)
*H04L 41/0895* (2022.01)
*H04L 41/342* (2022.01)

(52) U.S. Cl.
CPC ........ *H04L 41/342* (2022.05); *G06K 7/10366* (2013.01); *G06K 7/1413* (2013.01); *H04L 41/0895* (2022.05); *H04L 41/12* (2013.01)

(58) Field of Classification Search
CPC ...... H04L 41/0895; H04L 41/12; H04L 12/28
USPC .................................. 370/329, 400, 401, 403
See application file for complete search history.

(56) References Cited

U.S. PATENT DOCUMENTS 11,832,113 B2 * 11/2023 Kikinis ................ H04B 1/7176

FOREIGN PATENT DOCUMENTS

| JP | 2005339983 A | 12/2005 |
| JP | 2008099191 A | 4/2008 |

(Continued)

*Primary Examiner* — Dang T Ton
(74) *Attorney, Agent, or Firm* — SLATER MATSIL, LLP

(57) ABSTRACT

A cable connection management system of the present disclosure includes: an network orchestrator configured to obtain port ID information from an network device, the network device including a port to which a connector-attached cable is connected, the port ID information being on a port of the port to which the connector-attached cable is connected; an apparatus configured to obtain connector ID information on the connector-attached cable connected to the network device to transmit the connector ID information to a cable connection management server when the connector-attached cable is connected to the network device; and the cable connection management server configured to associate and store the connector ID information on the connector-attached cable and the port ID information.

14 Claims, 17 Drawing Sheets

(56) References Cited

FOREIGN PATENT DOCUMENTS

| JP | 2012242529 | A | 12/2012 |
| JP | 2014194681 | A | 10/2014 |

* cited by examiner

| NW DEVICE ID | PORT ID | PORT STATE |
|---|---|---|
| yyyyyyy | zzzzzzz | Active |
| dddddddd | vvvvvvv | Down |
| ...... | ...... | ...... |

Fig. 5A

| CONNECTOR ID | NW DEVICE ID | PORT ID | PORT STATE |
|---|---|---|---|
| xxxxxxxx | yyyyyyyy | zzzzzzzz | Active |
| ssssssss | dddddddd | vvvvvvvv | Down |
| ...... | ...... | ...... | ...... |

Fig. 5B

CABLE CONNECTION MANAGEMENT SYSTEM AND CABLE CONNECTION MANAGEMENT METHOD

CROSS-REFERENCE TO RELATED APPLICATIONS

This application is a national phase entry of PCT Application No. PCT/JP2019/021791, filed on May 31, 2019, which application is hereby incorporated herein by reference.

TECHNICAL FIELD

The present disclosure relates to a cable connection management system that manages a cable connection state in an NW device.

BACKGROUND

In a data center and the like, a network (NW) engineer connects many cables (optical fiber and LAN cable) to the NW device to build a network based on NW design. In order to manage which cable connector is connected to each port of the NW device, a list (database) must be produced so that a unique serial number is provided in advance to a cable connector, and a port number and a serial number of the cable connector are associated in the list when the cable connector is connected to the NW device.

FIGS. 13 and 14 are a diagram illustrating an overview of current cable connection management. In order to produce the above list, the NW engineer has to note the port number of the NW device and the serial number of the cable connector in the network construction site and enter them in the database. For this reason, a burden of the NW engineer becomes large. Also, in the case of manual input by the NW engineer, there is a risk that an erroneous serial number may be input.

Because the service provided by a network carrier or the like is frequently changed, the NW design is also changed accordingly, and connection between the NW devices is also changed frequently. Since the NW engineer changes cable connection in response to the change in connection between the NW devices, the list also needs to be updated in response to the cable connection change. However, the list often cannot be updated for a variety of reasons, such as a work site situation and emergency maintenance.

CITATION LIST

Patent Literature

Patent Literature 1: JP 2012-242529 A;
Patent Literature 2: JP 2014-194681 A.

SUMMARY

Technical Problem

In the case where the update of the list associating the port numbers of the cable connector and the NW device is delayed, the use of the installed connector cable will not be checked, so that the connector cable is left in the state where use or disuse of the connector cable is not checked. In addition, the NW engineer also has low motivation to update the cable connections in spite of a risk of service cutting. The cable that is left in this manner remains in a rack or a cable wiring line in a data center, and physically compress a wiring space.

In order to prevent such situation, the list that associates the ports of the cable connector and the NW device must be certainly produced and updated. However, there are many cases that are not successfully updated because the updating of the list at the network construction site is a very burden to the NW engineer. In the current system, a technique of gripping a situation of equipment using an IC tag attached to an optical fiber cable is proposed (for example, Patent Literatures 1 and 2). However, a system that can easily manage the connection status of the ports of the cable connector and the NW device is not put into practice.

The present disclosure is made to solve the above problem, and an object of the present disclosure is to provide a cable connection management system that can facilitate production and update of a list that associates a cable connector and a port number of an NW device without imposing a burden on an NW engineer in a network construction site.

Means for Solving the Problem

In order to solve the above problem, a cable connection management system according to the present disclosure includes: an NW orchestrator configured to obtain port ID information from an NW device, the NW device including at least one port to which a connector-attached cable is connected, the port ID information being on a port of the at least one port to which the connector-attached cable is connected; an apparatus configured to obtain connector ID information on the connector-attached cable connected to the NW device to transmit the connector ID information to a cable connection management server when the connector-attached cable is connected to the NW device; and the cable connection management server configured to associate and store the connector ID information on the connector-attached cable connected to the NW device sent from the apparatus and the port ID information obtained from the NW orchestrator, the port ID information being on the port to which the connector-attached cable is connected.

In order to solve the above problem, a cable connection management method according to the present disclosure in a cable connection management system including: an NW orchestrator configured to manage a port of an NW devices to which a connector-attached cable is connected; an apparatus configured to obtain a connector ID information on the connector-attached cable; and a cable connection management server configured to manage the connector ID information and port ID information on the port, the cable connection management method including: obtaining, by the apparatus, the connector ID information on the connector-attached cable to send the connector ID information to the cable connection management server when the connector-attached cable is connected to the NW device; obtaining, by the NW orchestrator, the port ID information on the port to which the connector-attached cable is connected from the NW device; receiving, by the cable connection management server, the connector ID information from the apparatus; obtaining, by the cable connection management server, port ID information from the NW orchestrator; and associating, by the cable connection management server, and storing the connector ID information and the port ID information.

Effects of Embodiments of the Invention

According to the present disclosure, a cable connection management system that can facilitate production and update of a list that associates a cable connector and a port number of an NW device without imposing a burden on an NW engineer can be provided in a network construction site.

BRIEF DESCRIPTION OF THE DRAWINGS

FIG. 5A is a diagram illustrating a configuration example of a port information database.

FIG. 5B is a diagram illustrating a configuration example of a connector information database.

DETAILED DESCRIPTION OF ILLUSTRATIVE EMBODIMENTS

Embodiments of the present disclosure will be described below. Note that the present disclosure is not limited to the embodiments described below.

First Embodiment

Configuration of Cable Connection Management System

Figure 1:
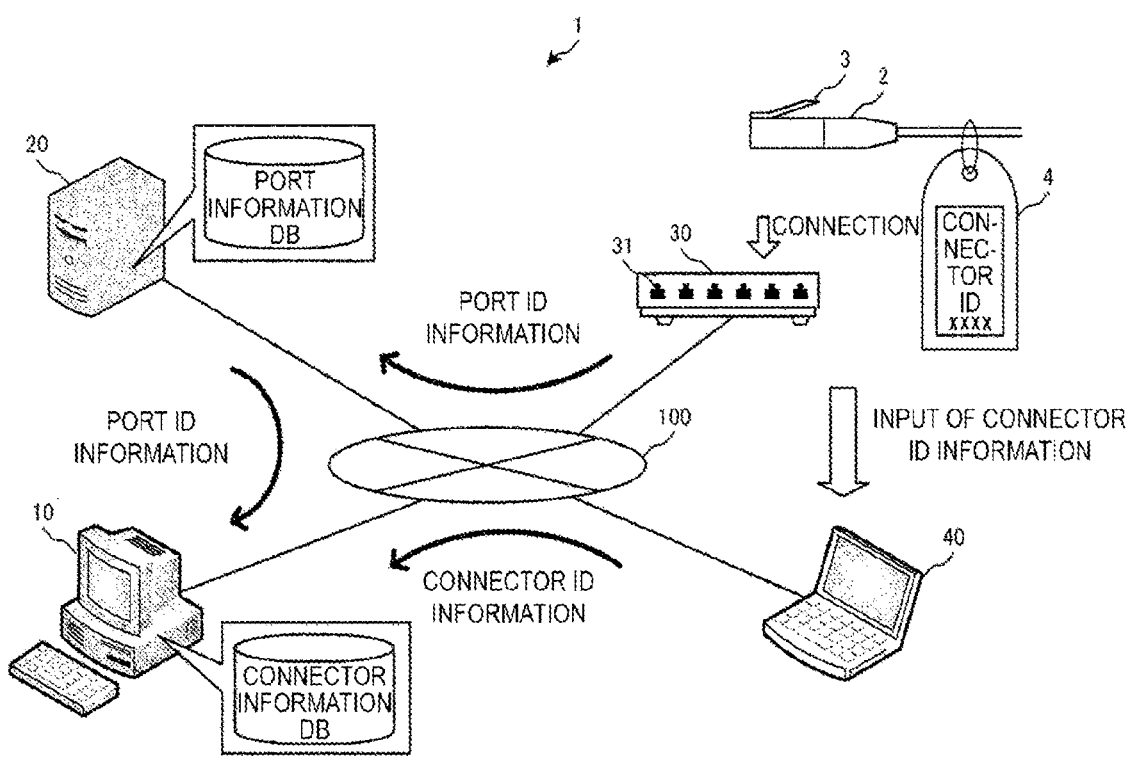
FIG. 1 is a diagram illustrating an outline of a cable connection management system according to a first embodiment.

As illustrated in FIG. 1, a cable connection management system 1 according to a first embodiment includes: a connector-attached cable 2 that includes a tag 4 to which a connector ID is described, an NW device 30 that includes at least one port 31 to which a connector-attached cable 2 is connected; an NW orchestrator 20 that collectively manages the NW device 30 implementing network design, a cable connection management server 10 that manages connector ID information on the connector-attached cable 2 and port ID information on the NW device 30, and a terminal 40 to which an NW engineer inputs an connector ID at a NW building site. The cable connection management server 10, the NW orchestrator 20, the NW device 30, and the terminal 40 are connected through a network 100.

The cable connection management server 10 and the NW orchestrator 20 can be implemented by a computer including a central processing unit (CPU), a storage unit and an I/F unit, more specifically, a computer including a CPU that executes a program implementing a predetermined function, a storage unit that functions as a database (DB) storing port information and connector information, and an I/F unit that transmits and receives information to and from an external device through a network. The cable connection management server 10 and the NW orchestrator 10 can be installed in the same housing, or the functions of the cable connection management server 10 and the NW orchestrator 20 can be mounted into a single computer.

Flow of Connector ID Information

Figure 2:
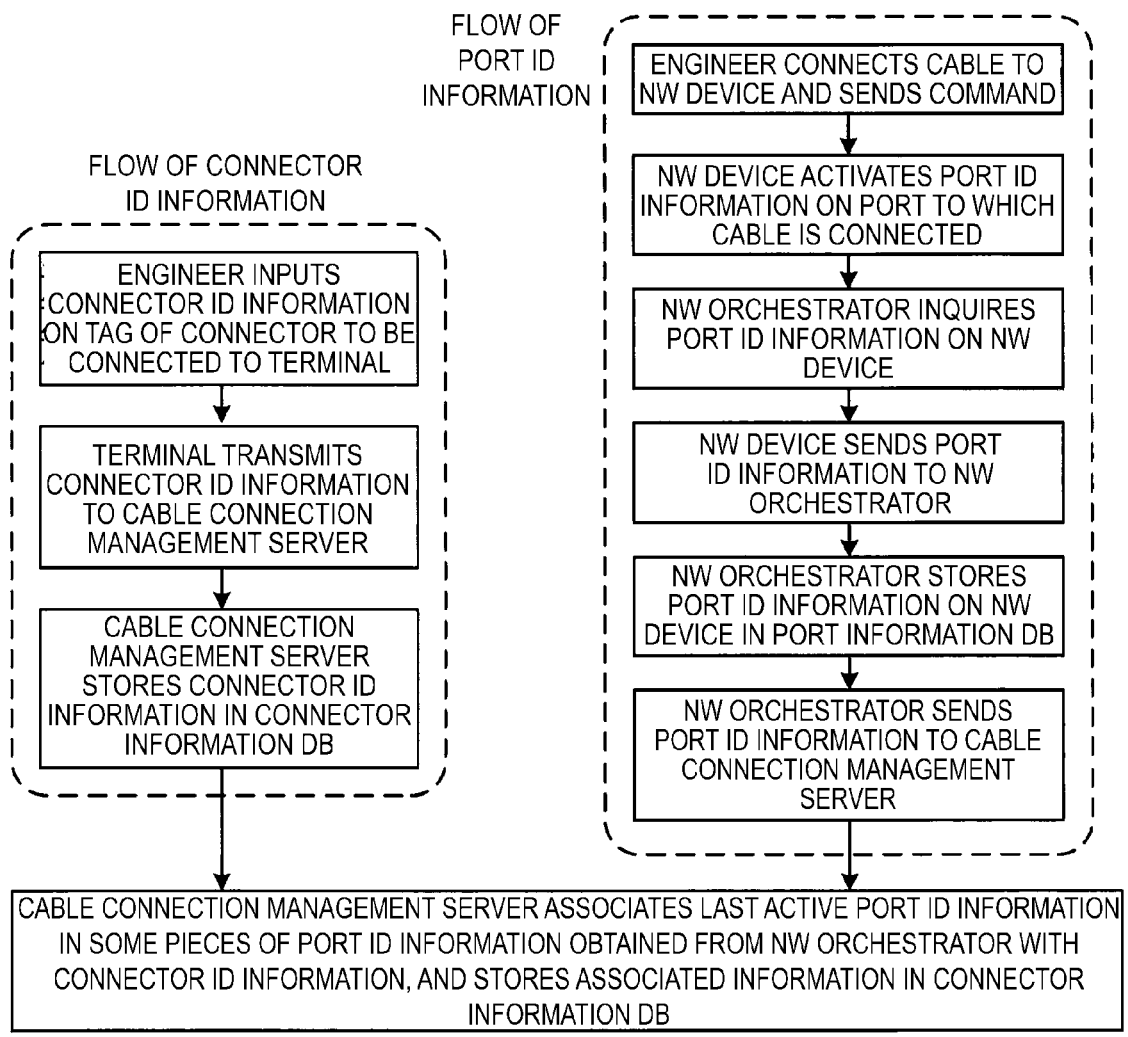
FIG. 2 is a diagram illustrating an outline of operation of the cable connection management system according to the first embodiment.

FIG. 2 is a diagram illustrating an outline of operation of the cable connection management system according to the first embodiment. The NW engineer inputs the connector ID information on the connector-attached cable 2 to the terminal 40 when connecting the connector-attached cable 2 to the NW device 30. At this point, information on the NW device 30 of a target may be input to the terminal 40 in advance. The terminal 40 to which the connector ID information is input transmits the input connector ID information to the cable connection management server 10 through the network 100.

The cable connection management server 10 can store the received connector ID information in the connector information database, obtain the port ID information by inquiring of the NW orchestrator 20 the port ID information, and associate the port ID information by the connector information database.

Flow of Port ID Information

The NW engineer connects the connector-attached cable 2 to the port 31 of the NW device 30, and sends a predetermined command to the NW device 30 so as to bring the connected port 31 into an active state. This command can be sent from the terminal 40 connected to the NW device 30 through the network 100, the cable connection management server 10, or the like.

The NW orchestrator 20 that collectively manages the NW devices 30 implementing the network design has an inquiry function (polling function) to monitor port states of the NW devices 30 to manage. The NW orchestrator 20 can use the inquiry function to obtain the port ID information on the port 31 to which the connector-attached cable 2 is connected. The inquiry function operates at all times and the inquiry is performed at predetermined intervals, so that the NW orchestrator 20 can obtain the current port ID information. The NW device ID information or the information on the port state (active/down) may be added to the port ID information.

The NW orchestrator 20 stores the port ID information obtained from the NW device 30 in a port information database (DB). For example, as illustrated in FIG. 5A, the port information database (DB) can store the NW device ID information and the port state (active/down) obtained from the NW device along with the port ID information.

The cable connection management server 10 obtains the port ID information on the port to which the connector-attached cable is connected by inquiring of the NW orchestrator 20 the port ID information. At this point, the NW orchestrator 20 can send information on the target NW device as filter information when retaining the information on the target NW device. The NW orchestrator 20 that receives the inquiry sends the port ID information in response to the inquiry from the cable connection management server 10. The information to be sent can include NW device ID information and port state (active/down).

The cable connection management server 10 associates and stores the connector ID information on the connector-attached cable 2, which is connected to the NW device 30 and sent from the apparatus 40, and the port ID information on the port 31 to which the connector-attached cable 2 obtained from the NW orchestrator 20. At this point, when the NW orchestrator 20 sends the port ID information on the last activated port, the connector ID information on the connector-attached cable 2 connected by the NW engineer and the port ID information input to the terminal 40 by the NW engineer can surely be associated. The NW orchestrator 20 can transmit a plurality of port ID states in time series, and the cable connection management server can associate the connector ID information on the cable connector transmitted from an apparatus and the port ID information on the port that finally becomes the active state.

FIG. 5B illustrates a configuration example of a connector information database (DB) of the cable connection management server 10. The connector information database (DB) can store, for each connector ID of the connector-attached cable, pieces of information on the NW device ID to which the connector-attached cable is connected, the port ID, and the port state (active/down) and manage which connector-attached cable with a predetermined connector ID is connected to which port of which NW device.

Figure 3:
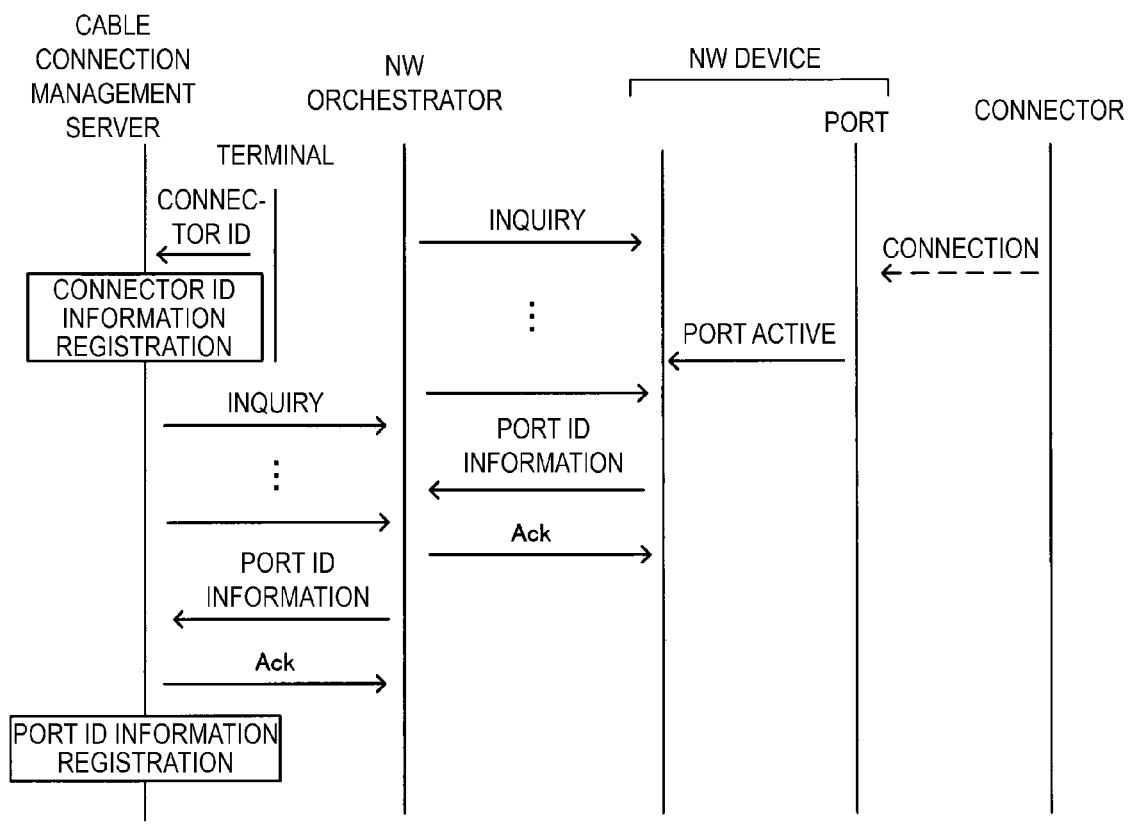
FIG. 3 is a diagram illustrating an operation sequence (during cable connection) of the cable connection management system according to the first embodiment.

FIG. 3 illustrates an operating sequence (during cable connection) of the cable connection management system according to the first embodiment. The cable connection management server receiving the connector ID information transmitted from the terminal is configured to obtain the information on the port to which the connector-attached cable is connected from the NW orchestrator. Thereby, it is possible to implement the combination of the port ID information on the port connected to the connector ID information.

Figure 4:
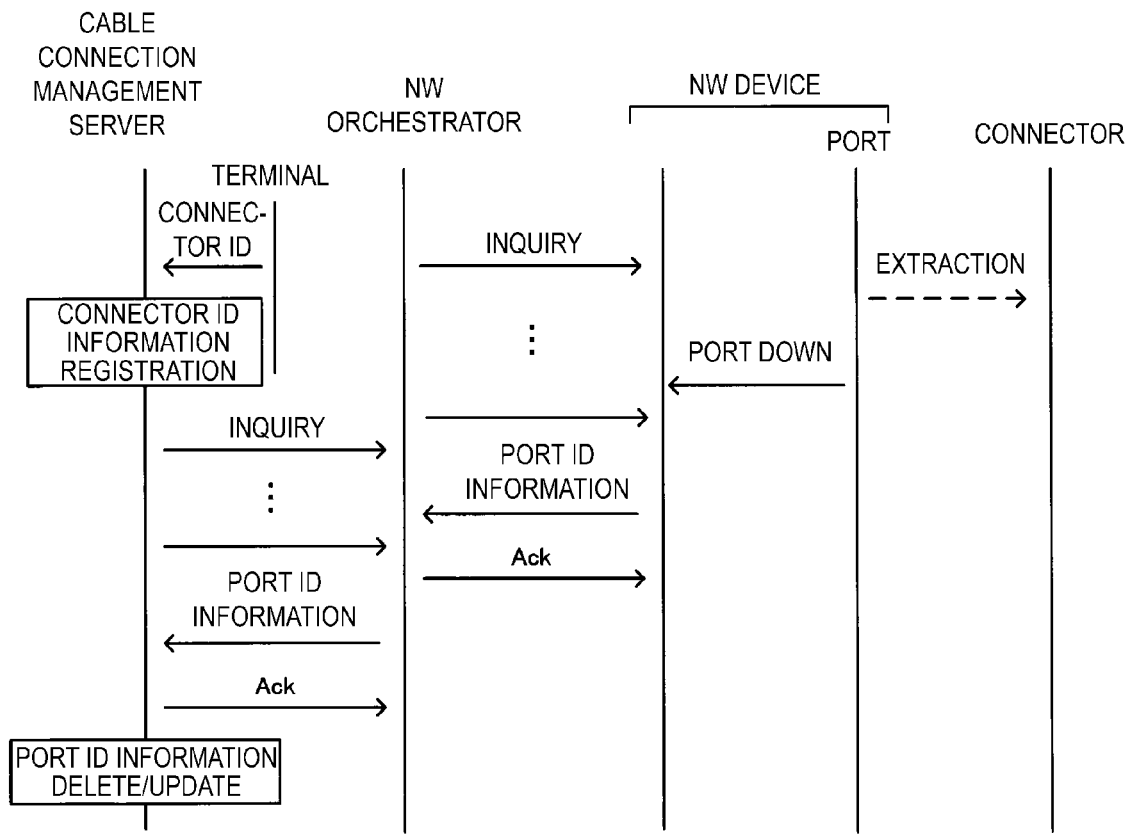
FIG. 4 is a diagram illustrating the operation sequence (during cable extraction) of the cable connection management system according to the first embodiment.

FIG. 4 illustrates an operating sequence (during cable extraction) of the cable connection management system according to the first embodiment. The port ID information may be deleted or the port state (active/down) may be updated even when the connector-attached cable is extracted from the port, so that the NW engineer does not need to update the connector information database (DB).

In the present embodiment, the tag in which the connector ID is described is previously given to the used connector-attached cable, the connector ID of the connector to be connected is transmitted to the cable connection management server when the connector-attached cable is connected to the NW device, and the information on the port to which the connector-attached cable is connected is obtained by the cable connection management server from the NW orchestrator. Thus, the cable connection management server can automatically produce and update the list in which the port ID information on the port connected to the connector ID information is combined. Since the NW engineer inputs the port ID information into the terminal, the work burden on the NW engineer involved in the production and update of the list will be significantly reduced. The management status of the connector ID information can be viewed by accessing the cable connection management server from the terminal connected to the network. In a network construction site, the connection state of the ports of the NW device can appropriately be checked.

Second Embodiment

In the first embodiment, the NW engineer inputs the connector ID information described in the tag 4 of the connector-attached cable that connects to the port of the NW device 30 to the terminal 40, and the terminal 40 to which the connector ID information is input is configured to send connector ID information to the cable connection management server 10. In a second embodiment, a barcode reader 50 is configured to read the connector ID information on a barcode described in the tag 4 and transmit the connector ID information to the cable connection management server 10.

Figure 6:
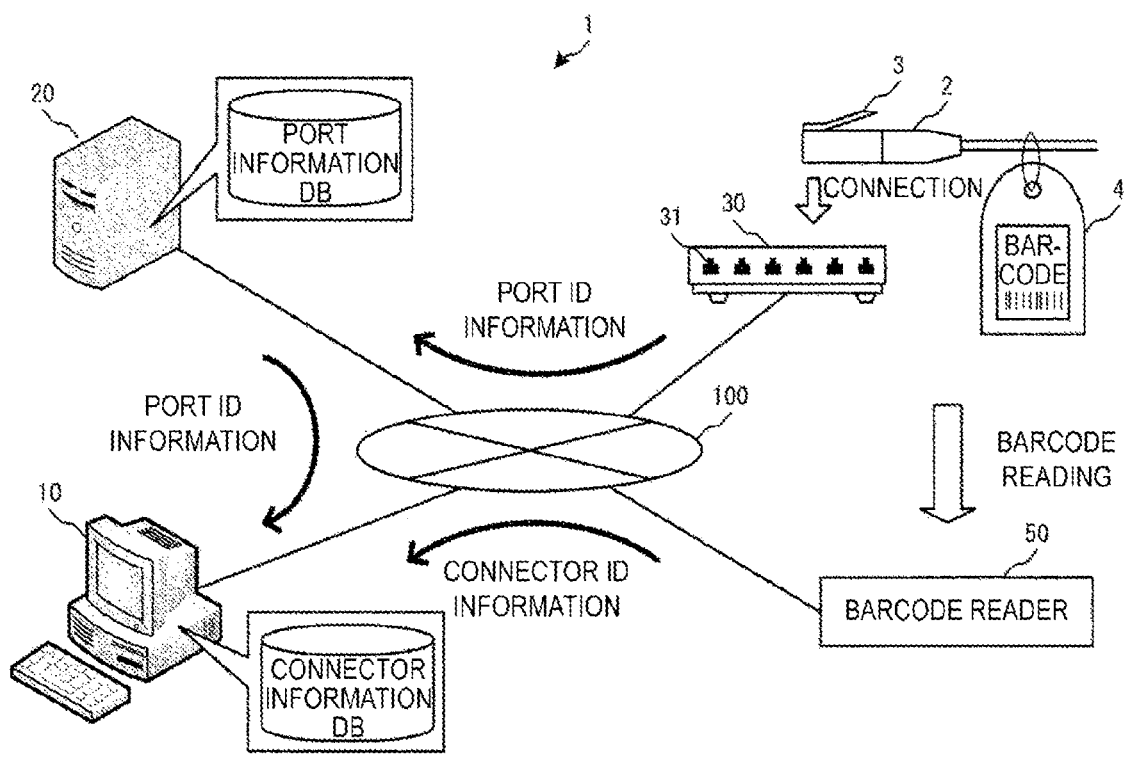
FIG. 6 is a diagram illustrating an outline of a cable connection management system according to a second embodiment.
Figure 7:
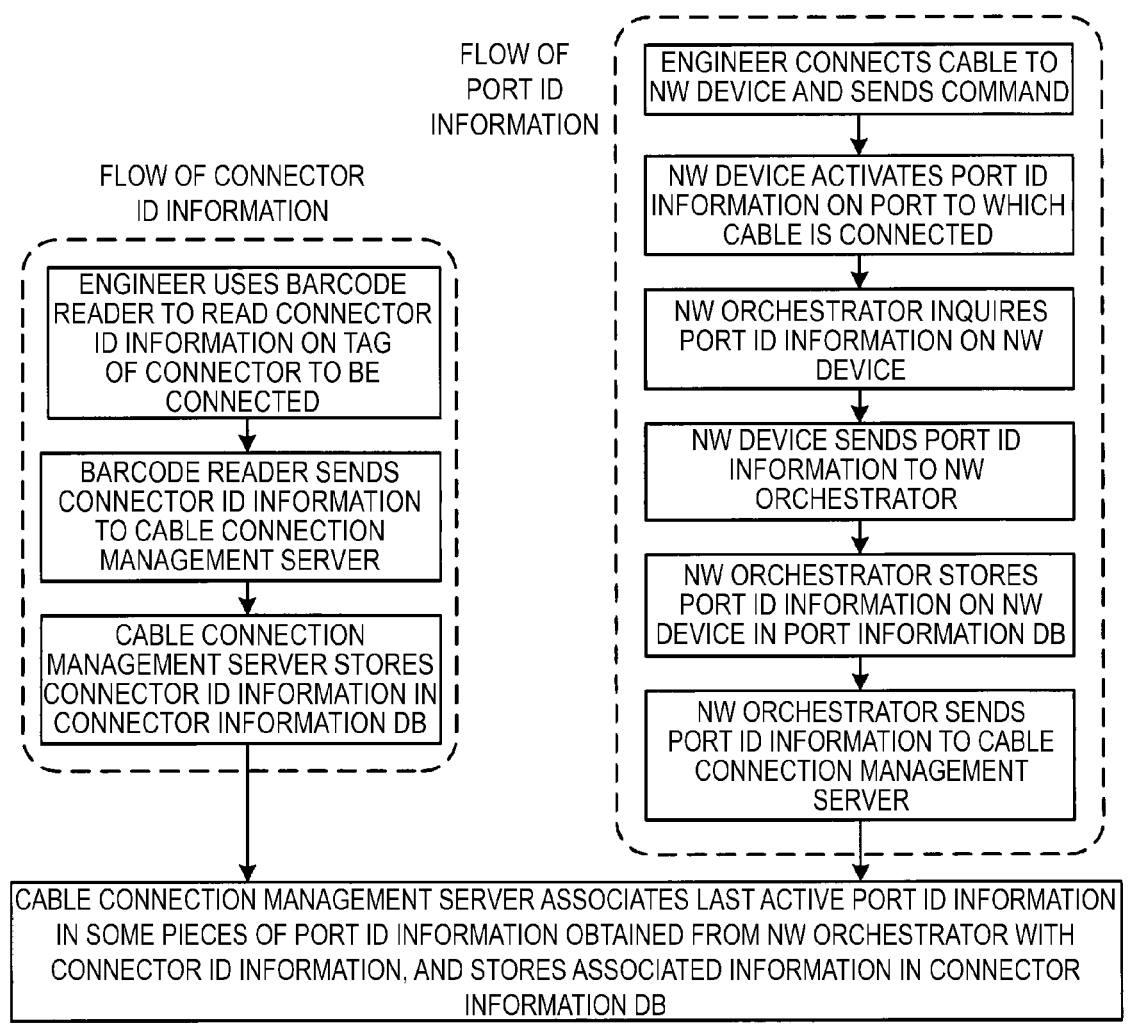
FIG. 7 is a diagram illustrating an outline of operation of the cable connection management system according to the second embodiment.
Figure 8:
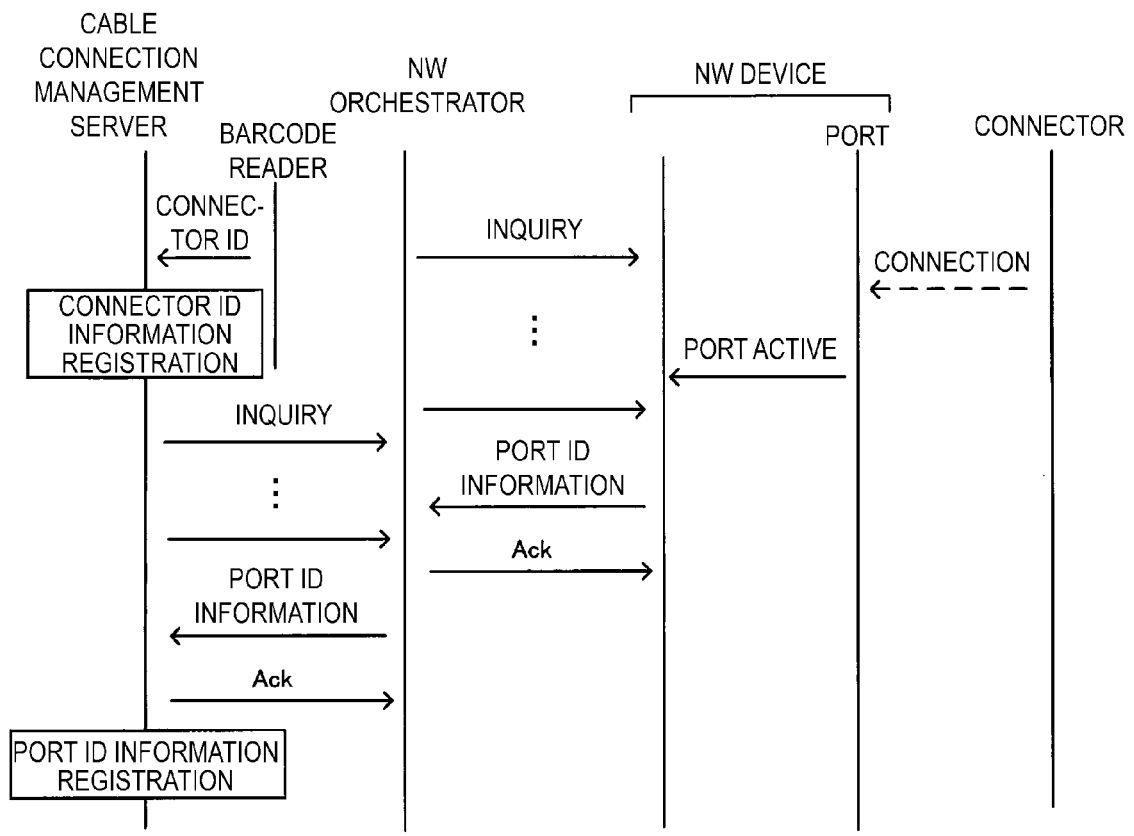
FIG. 8 is a diagram illustrating an operating sequence (during cable connection) of the cable connection management system according to the second embodiment.

FIGS. 6 to 8 are diagrams illustrating a cable connection management system according to the second embodiment, operation of the cable connection management system, and an operating sequence (during cable connection). In the second embodiment, the NW engineer uses the barcode reader 50 to read the connector ID information on the connector-attached cable 2 to be connected. After reading the connector ID information, the barcode reader 50 transmits the connector ID information to the cable connection management server 10 through the network 100, and the cable connection management server 10 stores the received connector ID information in the connector information database. The operation at the cable connection management server 10 is the same as that of the first embodiment, and the operation during cable extraction is the same as that of the first embodiment.

Although the case was described in which the connector ID information recorded in the barcode is read in FIGS. 6 to 8, an IC chip in which the connector ID information is recorded may be used instead of the barcode. In this case, the IC reader is used to read the connector ID information from the IC chip of the connector-attached cable with the connector to be connected, and the read connector ID information is sent to the cable connection management server through the network.

Third Embodiment

In the second embodiment, the barcode reader or the IC reader is configured to read the connector ID information recorded in the barcode/IC chip of the connector connected to the port of the NW device, and send the connector ID information to the cable connection management server. In a third embodiment, a wireless tag 70 included in the connector-attached cable 2 is configured to transmit the connector ID information to a wireless tag reader 60, and transmit the connector ID information received by the wireless tag reader 60 to the cable connection management server 10.

Figure 9:
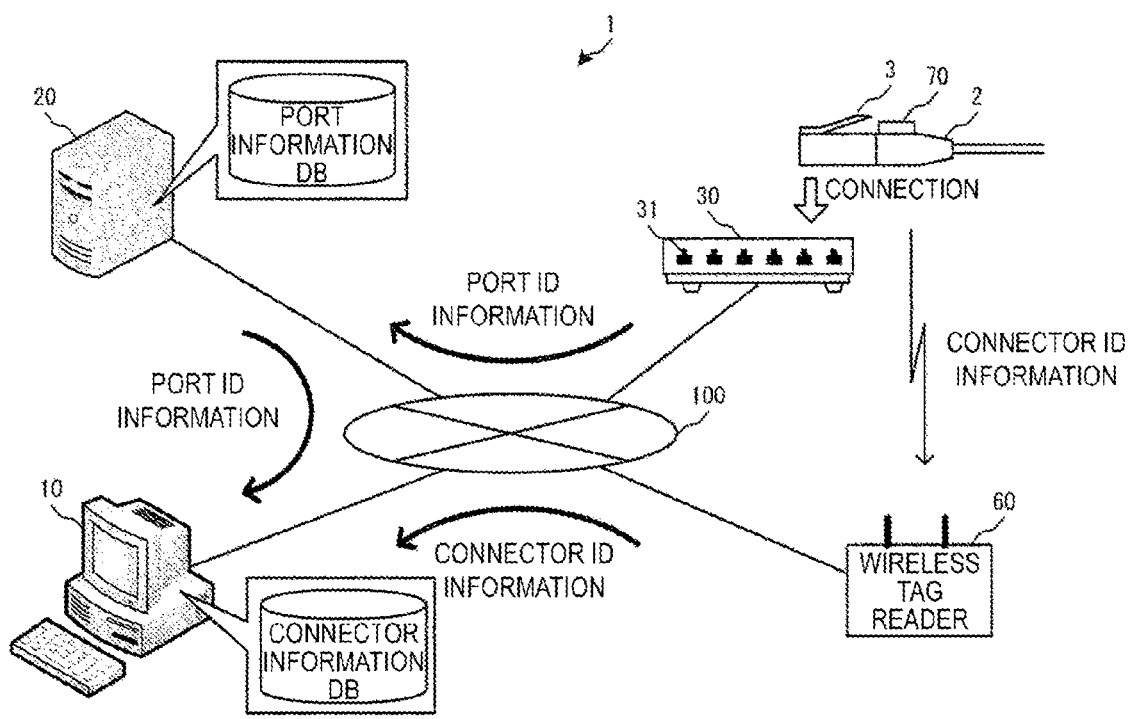
FIG. 9 is a diagram illustrating an outline of a cable connection management system according to a third embodiment.
Figure 10:
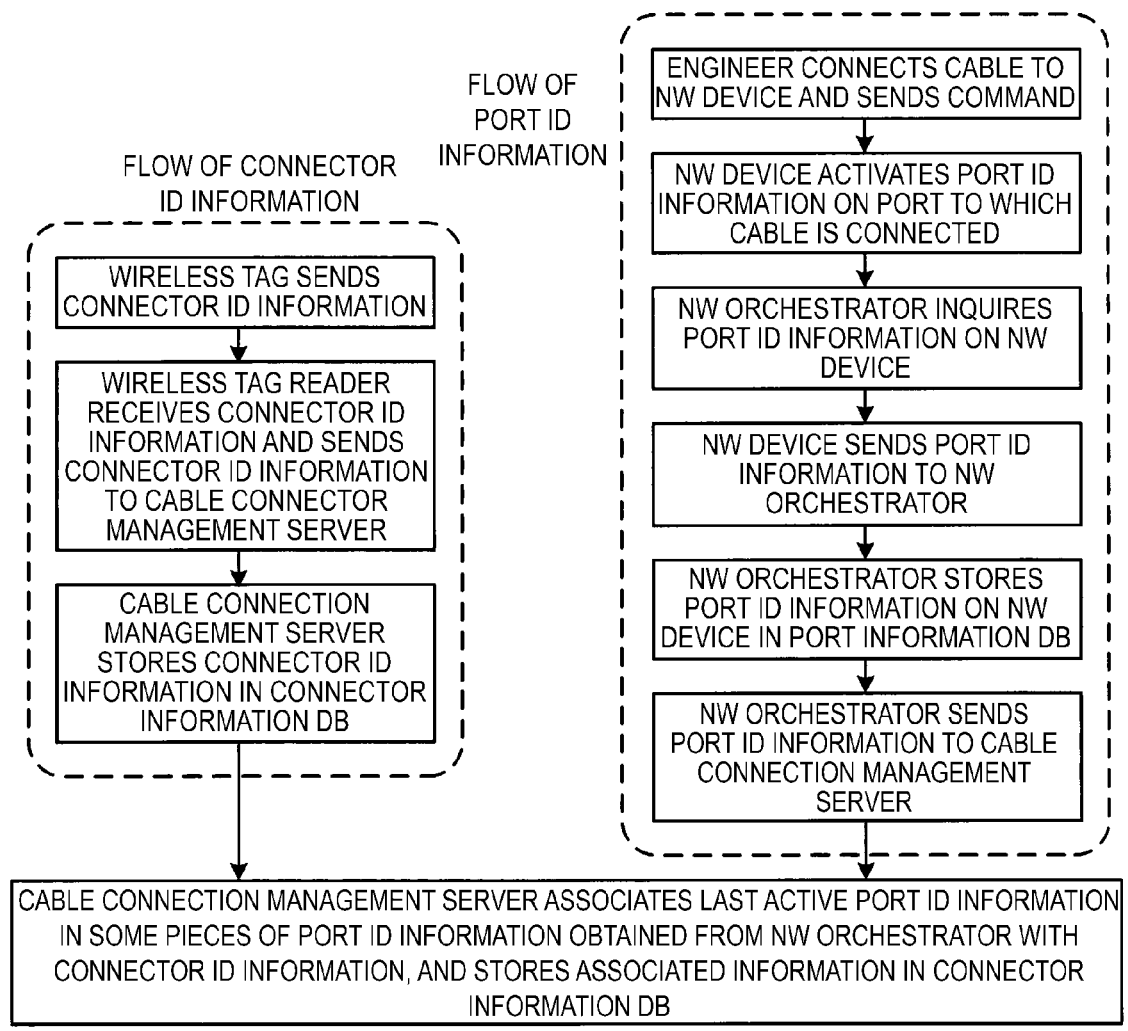
FIG. 10 is a diagram illustrating an outline of operation of the cable connection management system according to the third embodiment.
Figure 11:
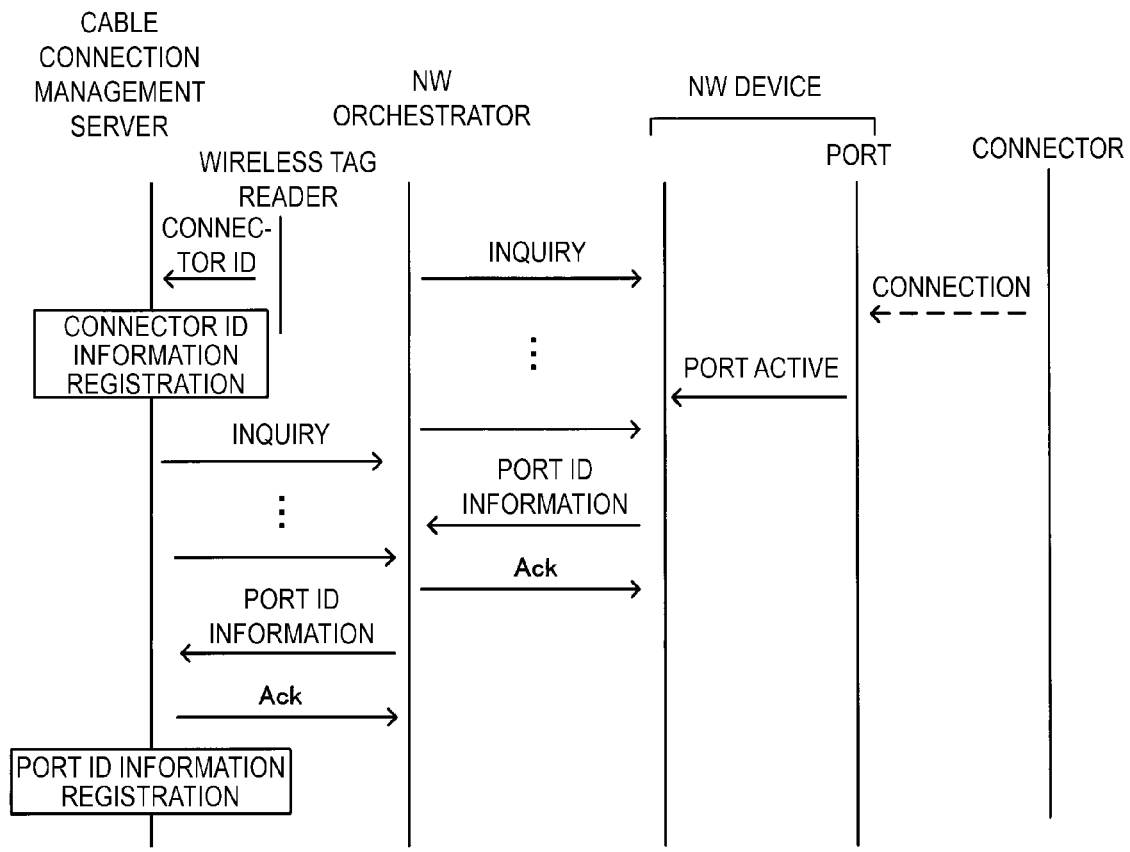
FIG. 11 is a diagram illustrating an operating sequence (during cable connection) of the cable connection management system according to the third embodiment.

FIGS. 9 to 11 are diagrams illustrating a cable connection management system according to the third embodiment, operation of a cable connection management system, and an operating sequence (during cable connection). In the third embodiment, the wireless tag 70 in which the connector ID information of the connector-attached cable 2 to be connected is recorded is configured to transmit the connector ID information to the wireless tag reader 60. After receiving the connector ID information, the wireless tag reader 60 transmits the connector ID information to the cable connection management server 10 through the network 100, and the cable connection management server 10 stores the received connector ID information in the cable connector information database. The operation at the cable connection management server 10 is the same as that of the first embodiment, and the operation during cable extraction is the same as that of the first embodiment. When the port ID is transmitted using the wireless tag, the work burden on the NW engineer involved in the production and update of the list is further reduced as compared to the first and second embodiments.

Figure 12A:
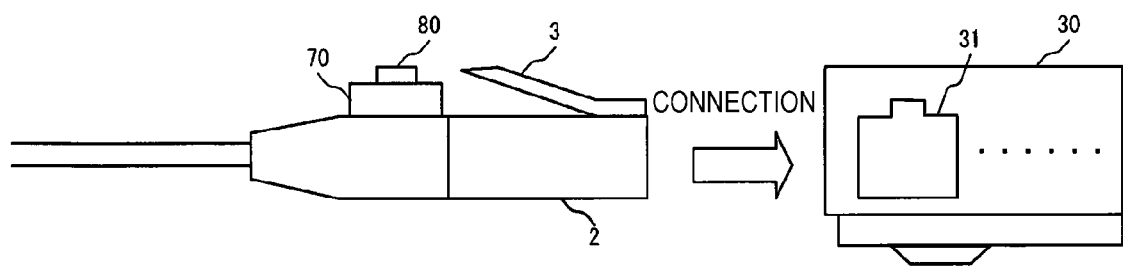
FIG. 12A is a diagram illustrating a configuration example of a connector provided with a wireless tag according to the third embodiment.
Figure 12B:
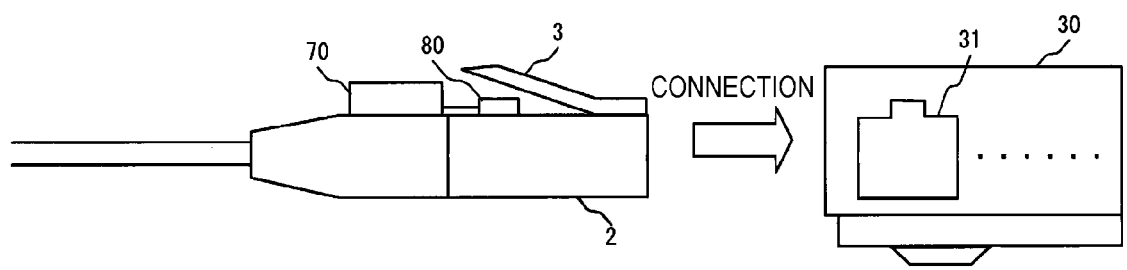
FIG. 12B is a diagram illustrating another configuration example of the connector provided with the wireless tag according to the third embodiment.
Figure 12C:
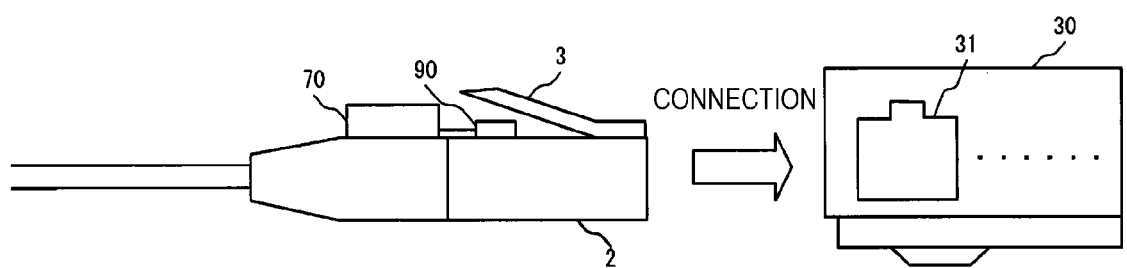
FIG. 12C is a diagram illustrating still another configuration example of the connector provided with the wireless tag according to the third embodiment.
Figure 13:
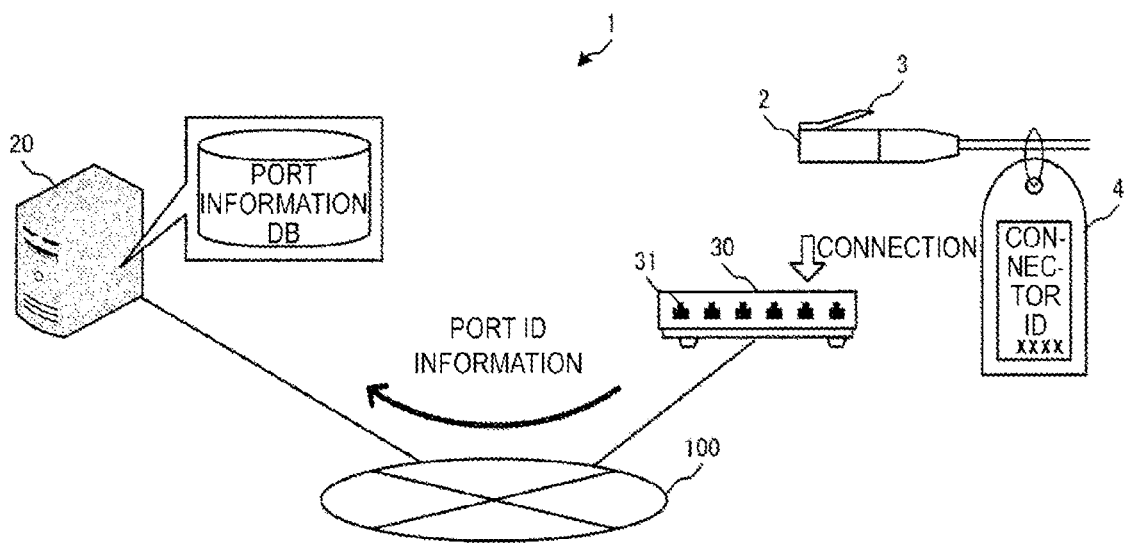
FIG. 13 is a diagram illustrating an overview of cable connection management.
Figure 14:
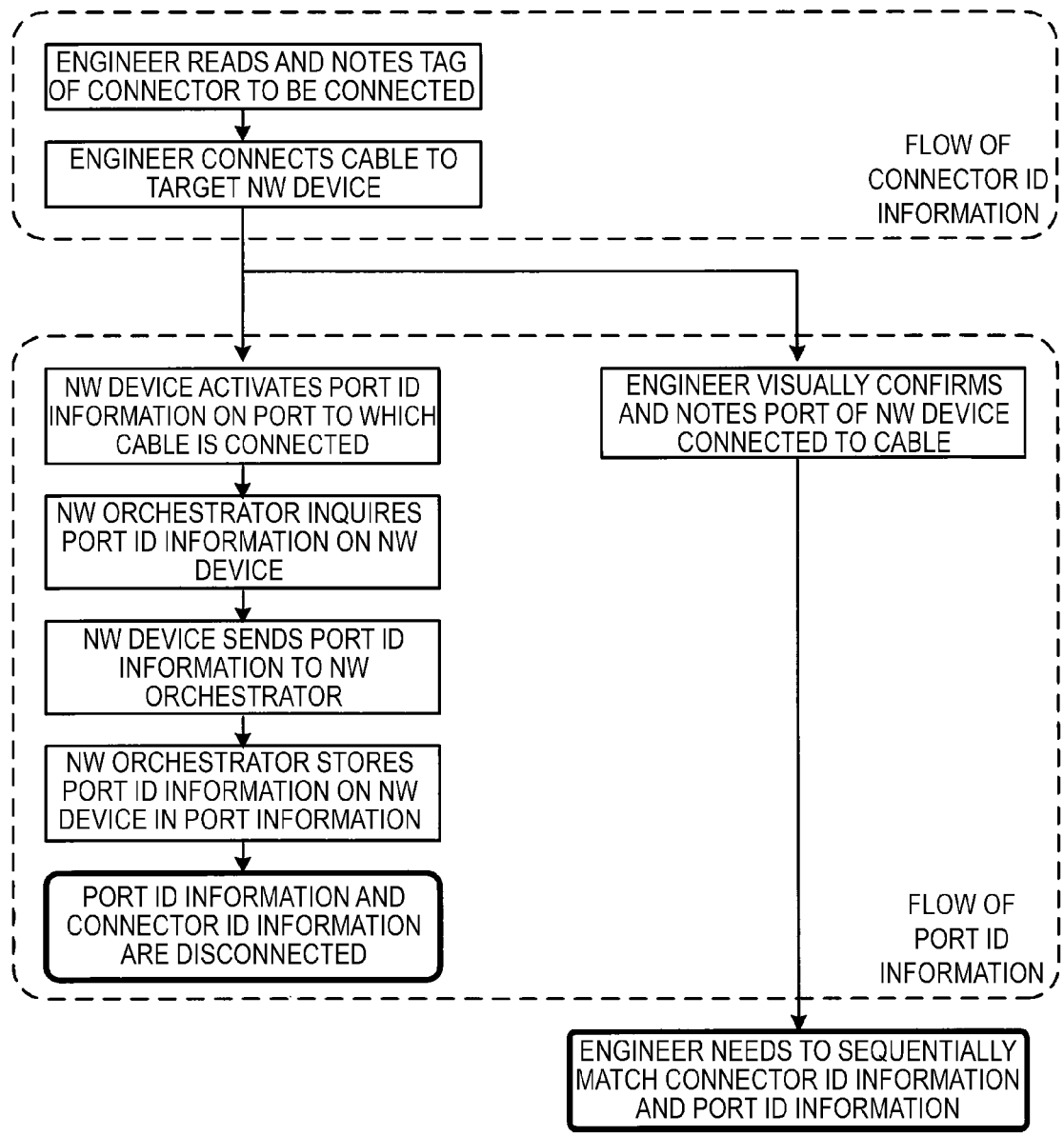
FIG. 14 is a diagram illustrating an overview of operation of the cable connection management.

FIGS. 12A to 12C are configuration examples of a connector-attached cable provided with the wireless tag according to the third embodiment. The configuration example of FIG. 12A includes a switch 80 that switches the wireless tag 70 included in the connector of the connector-attached cable from an off state to an on state. The configuration is made such that connector ID information is sent when the NW engineer operates the switch 80 to connect the connector-attached cable 2 to the port 31 of the NW device 30. At this point, in response to the operation of the switch 80, the wireless tag 70 starts the transmission of a wireless signal including the connector ID information, and receives Ack of reception completion from the wireless tag reader 60 to stop the transmission of the wireless signal including the connector ID information. Consequently, power consumption of a built-in battery of the wireless tag 70 can be conserved. The configuration may be made such that the transmission of the connector ID information stops after a predetermined amount of time passes since the transmission of the connector ID information starts.

The configuration example of FIG. 12B is configured to place the switch 80, which switches the wireless tag 70 from the off state to the on state, in a lower portion of a notch 3 of the connector. The switch placed at the lower portion of the notch 3 is configured to be operated in response to displacement of the notch 3 when the connector is connected to the NW device 30. The notch is displaced downward when the connector is connected, so that the switch 80 can be operated to switch the wireless tag 70 from the off state to the on state. When such a connector is used, the switch operation of the NW engineer becomes unnecessary, and the wireless tag 70 can automatically transmit the connector ID information only by connecting the connector. The transmission stop operation of the connector ID information is the same as that in FIG. 12A.

As illustrated in FIG. 12C, the wireless tag 70 may be configured to transmit the connector ID information using power generated by a power generation circuit 90 included in the connector. In the configuration of FIGS. 12A and 12B, the built-in battery that supplies the power for transmitting the wireless signal to the wireless tag 70 is required. However, when a configuration is provided with the power generation circuit 90 illustrated in FIG. 12C, the built-in battery for the wireless tag is unnecessary.

For example, when the power generation circuit 90 is mounted to an unshielded twisted pair (UTP) cable connector unit, the power generation circuit 90 is mounted in a location in which a twist pair of UTP cables is unwound, which allows the power to be generated by electromagnetic induction of a leakage magnetic field generated by signal current flowing during cable insertion. When the connector including the power generation circuit 90 can be used, a configuration in which the switch operation of the NW engineer becomes unnecessary and in which the connector ID information is automatically transmitted only by connecting the connectors, so that the work burden on the NW engineer can be further reduced.

INDUSTRIAL APPLICABILITY

The present disclosure can be utilized in a system managing the port connection state of the cable connector and the NW device in a network construction site, such as data center, which performs many cable connections.

REFERENCE SIGNS LIST

1 Cable connection management system
2 Connector-attached cable
3 Notch
4 Tag
10 Cable connection management server
20 NW Orchestrator
30 NW device
31 Port
40 Terminal
50 Barcode reader
60 Wireless tag reader
70 Wireless tag
80 Switch
90 Power generation circuit
100 Network.

The invention claimed is:

1. A cable connection management system comprising:
a network orchestrator configured to:
  obtain port ID information from a network device in response to a first inquiry transmitted to the network device and based on the network device having previously received a command to activate a port associated with the port ID information, wherein:
    the network device includes the port to which a connector-attached cable is connected, and
    the port ID information being on the port to which the connector-attached cable is connected; and
  transmit the port ID information to a cable connection management server in response to a second inquiry from the cable connection management server, the second inquiry comprising connector ID information;
an apparatus configured to:
  obtain the connector ID information on the connector-attached cable connected to the network device; and
  transmit the connector ID information to the cable connection management server when the connector-attached cable is connected to the network device; and
the cable connection management server configured to:
  receive the connector ID information from the apparatus;
  transmit the second inquiry to the network orchestrator including the connector ID information in response to receiving the connector ID information;
  receive, in response to the second inquiry, the port ID information from the network orchestrator; and
  associate and store the connector ID information on the connector-attached cable received from the apparatus and the port ID information received from the network orchestrator.

2. The cable connection management system according to claim 1, wherein:

the connector-attached cable includes a tag in which the connector ID information is described; and the apparatus is configured to transmit the connector ID information to the cable connection management server.

3. The cable connection management system according to claim 1, wherein:

the connector-attached cable includes a barcode or an IC chip in which the connector ID information is recorded;

the apparatus is a barcode reader or an IC reader that reads the connector ID information from the barcode or the IC chip; and the apparatus is configured to transmit the connector ID information read from the barcode or the IC chip to the cable connection management server.

4. The cable connection management system according to claim 1, wherein:

the connector-attached cable includes a wireless tag in which the connector ID information is recorded;

the apparatus is a wireless tag reader that receives the connector ID information transmitted by the wireless tag; and the apparatus is configured to transmit the connector ID information transmitted by the wireless tag to the cable connection management server.

5. The cable connection management system according to claim 4, wherein:

the connector-attached cable includes a switch that switches the wireless tag from an off state to an on state; and the wireless tag is configured to start transmitting the connector ID information in response to operation of the switch.

6. The cable connection management system according to claim 5, wherein the switch is configured to be operated in response to displacement of a notch of the connector-attached cable when connected to the network device.

7. The cable connection management system according to claim 4, wherein:

the connector-attached cable includes a power generation circuit that generates power using a magnetic field generated by current flowing when the connector-attached cable is connected to the network device; and the wireless tag is configured to transmit the connector ID information using the power generated by the power generation circuit.

8. A cable connection management method in a cable connection management system including:

a network orchestrator configured to:
manage a port of a network device to which a connector-attached cable is connected;

an apparatus configured to:
obtain a connector ID information on the connector-attached cable; and a cable connection management server configured to:
manage the connector ID information and port ID information on the port, the cable connection management method comprising:

obtaining, by the apparatus, the connector ID information on the connector-attached cable when the connector-attached cable is connected to the network device;

sending, by the apparatus, the connector ID information to the cable connection management server when the connector-attached cable is connected to the network device;

obtaining, by the network orchestrator, the port ID information on the port from the network device in response to a first inquiry transmitted to the network device and based on the network device having previously received a command to activate the port associated with the port ID information;

receiving, by the cable connection management server, the connector ID information from the apparatus;

transmitting, by the cable connection management server, a second inquiry to the network orchestrator including the connector ID information in response to receiving the connector ID information;

obtaining, by the cable connection management server, the port ID information from the network orchestrator in response to the second inquiry; and associating and storing, by the cable connection management server, the connector ID information and the port ID information.

9. The cable connection management method according to claim 8, wherein:

the connector-attached cable includes a tag in which the connector ID information is described; and the apparatus is configured to transmit the connector ID information to the cable connection management server.

10. The cable connection management method according to claim 8, wherein:

the connector-attached cable includes a barcode or an IC chip in which the connector ID information is recorded;

the apparatus is a barcode reader or an IC reader that reads the connector ID information from the barcode or the IC chip; and the apparatus is configured to transmit the connector ID information read from the barcode or the IC chip to the cable connection management server.

11. The cable connection management method according to claim 8, wherein:

the connector-attached cable includes a wireless tag in which the connector ID information is recorded;

the apparatus is a wireless tag reader that receives the connector ID information transmitted by the wireless tag; and the apparatus is configured to transmit the connector ID information transmitted by the wireless tag to the cable connection management server.

12. The cable connection management method according to claim 11, wherein:

the connector-attached cable includes a switch that switches the wireless tag from an off state to an on state; and the wireless tag is configured to start transmitting the connector ID information in response to operation of the switch.

13. The cable connection management method according to claim 12, wherein the switch is configured to be operated in response to displacement of a notch of the connector-attached cable when connected to the network device.

14. The cable connection management method according to claim 11, wherein:

the connector-attached cable includes a power generation circuit that generates power using a magnetic field generated by current flowing when the connector-attached cable is connected to the network device; and the wireless tag is configured to transmit the connector ID information using the power generated by the power generation circuit.

* * * * *